2,738,351
SUBSTITUTED GLYCEROL ETHERS

Harry Leo Dickison and Lee C. Cheney, Fayetteville, N. Y., assignors to Bristol Laboratories Inc., Syracuse, N. Y., a corporation of New York No Drawing. Application August 2, 1952, Serial No. 302,424

6 Claims. (Cl. 260—293.4)

This invention relates to a class of organic compounds of therapeutic value and to methods for the preparation thereof. More particularly, this invention relates to a series of basically substituted ethers of glycerol.

The new compounds of the present invention are the free bases, the acid addition salts and the quaternary salts of the bases which may be represented by the following general formula:

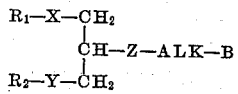

wherein $R_1$ and $R_2$ represent members selected from the group consisting of alkyl, aralkyl, aryl, cycloalkyl, nitro-substituted aryl, halogen-substituted aryl, alkyl-substituted aryl, and alkoxy-substituted aryl; X, Y, and Z represent members selected from the group consisting of O, S and $SO_2$; ALK represents straight and branched chain bivalent alkylene radicals containing from one to six carbon atoms inclusive; and B represents a member selected from the group consisting of di(lower)alkylamino, piperidino, morpholino, pyrrolidino, (lower)alkylpyrrolidino, N'-alkyl-piperazino, and pipecolino.

The compounds of this invention are useful local anesthetic agents which are of value in veterinary and clinical medicine.

The compounds of the present invention may be prepared in general via conversion of the particular 1,3-di-(substituted)-2-propanol into the corresponding alkali salt by employing a suitable inert solvent, such as toluene, for the substituted 2-propanol and heating and stirring this solution with somewhat less than the stoichiometrical amount of an alkali metal, an alkali metal amide or an alkali metal hydride until the formation of the corresponding alkali salt is substantially complete. The appropriate tertiary-aminoalkyl halide is then added to the reaction flask and heating is continued until the ether is formed. The product can be purified by distillation under reduced pressure or by recrystallization of a suitable salt, such as the hydrochloride or dihydrogen citrate from a favorable solvent.

It is apparent to one skilled in the art that other methods of synthesis can be devised. For example, a 1,3-disubstituted-2-propyl halide can be caused to react with an alkali metal salt of the appropriate alcohol. Alternatively, the basic ethers can be prepared by causing an alkali salt of 1,3-disubstituted-2-propanol to react with an equivalent quantity of an alkylene dihalide; the halogenated alkyl ether thus formed can then be caused to react with a secondary or tertiary amine to give the desired product or with potassium phthal-imide or a primary amine to give the desired product after additional isolation and alkylation. The mercapto compounds are oxidized to sulfones in the usual manner, as with potassium permanganate.

The following examples will serve to illustrate the invention without limiting it thereto.

EXAMPLE I

1,3-bis(p-chlorophenoxy)-2-propanol

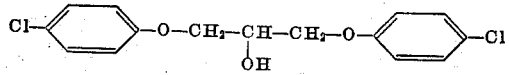

A mixture of 282.5 g. (2.2 moles) of p-chlorophenol and 48 g. (1.2 moles) of flake sodium hydroxide in 200 ml. of dioxane is heated for thirty minutes on the steam bath with mechanical stirring. With continued heating and stirring, 92.5 g. (1 mole) of epichlorohydrin is added over a forty-five minute period. The mixture is stirred and heated for 5½ hours and poured into 800 cc. of water. The precipitated oil crystallizes on cooling. It is collected by filtration, washed with water, and recrystallized from isopropyl alcohol. The product, M. P. 91–92° C., is obtained.

Analysis.—Calculated for $C_{15}H_{14}Cl_2O_3$:

|   | Calculated | Found |
|---|---|---|
| C | 57.5 | 57.1 and 57.8. |
| H | 4.52 | 4.82 and 4.32. |

EXAMPLE II

1,3-bis(3,5-xylyloxy)-2-propanol

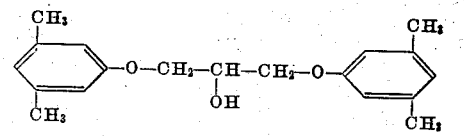

By the method of Example I, employing 188.4 g. (1.54 moles) of 3,5-xylenol, 33.6 g. (0.84 mole) of flake sodium hydroxide, 64.8 g. (0.7 mole) of epichlorohydrin and 200 ml. of dioxane, the aforementioned product is prepared. Subsequent recrystallizations from isopropyl alcohol, cyclohexane-Skellysolve "A," and Skellysolve "B," yield the product; M. P. 68–69° C.

Analysis.—Calculated for $C_{19}H_{24}O_3$:

|   | Calculated | Found |
|---|---|---|
| C | 75.9 | 76.1 |
| H | 8.04 | 7.83 |

EXAMPLE III

1,3-bis(p-ethoxyphenoxy)-2-propanol

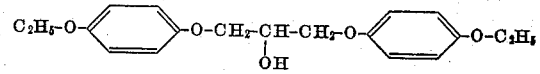

This compound is prepared by the method of Example I, utilizing 213.0 g. (1.54 moles) of p-ethoxyphenol, 33.6 g. (0.84 mole) of flake sodium hydroxide, 64.8 g. (0.70 mole) of epichlorohydrin and 200 ml. of dioxane. The product is obtained after one recrystallization from isopropyl alcohol; M. P. 95–96.5° C.

Analysis.—Calculated for $C_{19}H_{24}O_5$:

|   | Calculated | Found |
|---|---|---|
| C | 68.6 | 68.8 |
| H | 7.26 | 7.09 |

EXAMPLE IV

*1,3-bis(4-chloro-3,5-xylyloxy)-2-propanol*

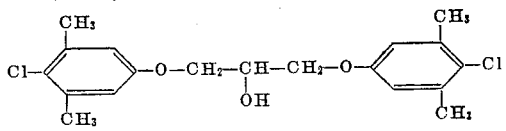

By the procedure of Example I, using 172.3 g. (1.1 moles) of 4-chloro-3,5-xylenol, 24.0 g. (0.6 mole) of flake sodium hydroxide, 46.3 g. (0.5 mole) epichlorohydrin, and 200 ml. of dioxane, the aforementioned compound is prepared. Recrystallizations, with use of charcoal, from Skellysolve "C" and Skellysolve "B" give purified product; M. P. 89–90° C.

*Analysis.*—Calculated for $C_{19}H_{22}Cl_2O_3$:

|   | Calculated | Found |
|---|---|---|
| C | 61.9 | 61.8 |
| H | 6.00 | 5.96 |

EXAMPLE V

*1,3-bis(2,4-dichlorophenoxy)-2-propanol*

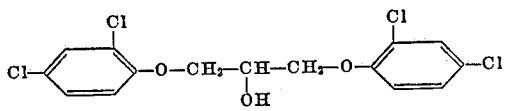

This compound is prepared by the procedure of Example I, using 150.0 g. (0.92 mole) of 2,4-dichlorophenol, 20.0 g. (0.50 mole) of flake sodium hydroxide, 39.0 g. (0.42 mole) of epichlorohydrin, and 100 ml. of dioxane. The crude product is obtained. Recrystallizations with use of charcoal, from isopropyl alcohol, acetone, and ethyl alcohol give product of M. P. 128.5–129° C.

*Analysis.*—Calculated for $C_{15}H_{12}Cl_4O_3$:

|   | Calculated | Found |
|---|---|---|
| C | 47.1 | 47.3 |
| H | 3.16 | 3.52 |

EXAMPLE VI

*1,3-bis(2,4,5-trichlorophenoxy)-2-propanol*

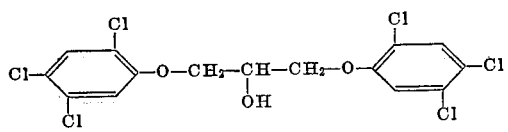

By the utilization of 83.0 g. (0.42 mole) of 2,4,5-trichlorophenol, 8.8 g. (0.22 mole) of flake sodium hydroxide, 50 ml. of dioxane, and 19.5 g. (0.20 mole) of epichlorohydrin, the aforementioned compound is prepared by the procedure of Example I. The product does not crystallize when the reaction mixture is poured into water and is extracted into chloroform. The combined chloroform extracts are washed with 10% sodium hydroxide, water, and saturated sodium chloride solution. Drying over anhydrous magnesium sulfate and removal of the solvent by distillation yields 63.0 g. of dark, gummy solid. Recrystallizations from acetone, ethyl alcohol, and isopropyl alcohol give a white product; M. P. 124.5–127° C.

*Analysis.*—Calculated for $C_{15}H_{10}Cl_6O_3$:

|   | Calculated | Found |
|---|---|---|
| C | 39.9 | 40.0 |
| H | 2.23 | 2.30 |

EXAMPLE VII

*1,3-bis(phenylmercapto)-2-propanol*

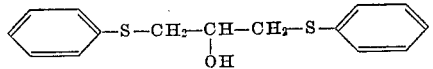

A mixture of 61.7 g. (0.56 mole) of thiophenol and 12.8 g. (0.32 mole) of flake sodium hydroxide in 100 ml. of dioxane is stirred and heated for one hour on the steam bath and 24.0 g. (0.26 mole) of epichlorohydrin is added to the homogeneous mixture, with continued heating and stirring, over a 20-minute period. The mixture is heated for five hours and poured into water. The precipitated oil is extracted into chloroform and the combined extracts are washed with water, saturated sodium chloride solution, and filtered through anhydrous magnesium sulfate. Distillation yields a small forerun of diphenyl disulfide and the product as a viscous yellow oil of B. P. 192° C./1 mm. to 225° C./3.5 mm.

*Analysis.*—Calculated for $C_{15}H_{16}OS_2$:

|   | Calculated | Found |
|---|---|---|
| C | 65.1 | 65.2 |
| H | 5.83 | 5.68 |

EXAMPLE VIII

*1,3-bis(o-methylphenylmercapto)-2-propanol*

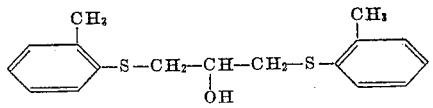

This compound is prepared by the procedure of Example VII, employing 49.6 g. (0.38 mole) of o-thiocresol, 11.2 g. (0.28 mole) of flake sodium hydroxide, 65 ml. of dioxane and 16.7 g. (0.18 mole) of epichlorohydrin. The product is obtained as a yellow oil boiling at 208–218° C./less than 1 mm.

*Analysis.*—Calculated for $C_{17}H_{20}OS_2$:

|   | Calculated | Found |
|---|---|---|
| C | 67.0 | 67.2 |
| H | 6.61 | 7.00 |

EXAMPLE IX

*1-(o-methylphenylmercapto)-3-phenoxy-2-propanol*

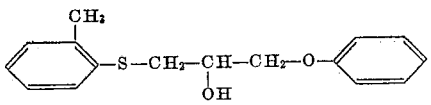

65.0 g. (0.432 mole) of glycidyl phenyl ether is added over a 45-minute period to a solution of 56.5 g. (0.455 mole) of o-thiocresol in 110 ml. of dioxane which is stirred and heated on the steam bath. After 19 hours of heating, the cooled mixture is extracted three times with 5% sodium hydroxide, washed with water until neutral, washed once with saturated sodium chloride solution, and filtered through anhydrous sodium sulfate. Distillation yields the product as a yellow oil of B. P. 184–191° C. at less than 1 mm.

*Analysis.*—Calculated for $C_{16}H_{18}O_2S$:

|   | Calculated | Found |
|---|---|---|
| C | 70.0 | 70.2 |
| H | 6.61 | 6.75 |

EXAMPLE X

*1-phenylmercapto-3-(o-toloxy)-2-propanol*

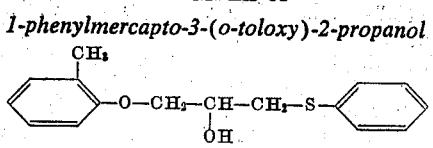

A mixture of 37.4 g. (0.34 mole) of thiophenol and 14.4 g. (0.36 mole) of flake sodium hydroxide in 100 ml. of dioxane is stirred and heated on the steam bath for one hour. To the resultant mixture is added 66.5 g. (0.33 mole) of 1-chloro-3-(o-toloxy)-2-propanol (prepared by the method of Boyd and Marle, J. C. S. 97, 1788) over a half-hour period. After five hours of heating, the mixture is poured into water. The precipitated oil is collected by three extractions with chloroform, the combined extracts are washed with water and saturated sodium chloride solution and filtered through anhydrous magnesium sulfate. Distillation yields the product, boiling from 183° C./1 mm. to 210° C./3.5 mm., the majority being collected at 205–210° C./3.5 mm.

*Analysis.*—Calculated for $C_{16}H_{18}O_2S$:

|   | Calculated | Found |
|---|---|---|
| C | 70.0 | 70.1 |
| H | 6.61 | 6.45 |

EXAMPLE XI

*1-ethylmercapto-3-(o-toloxy)-2-propanol*

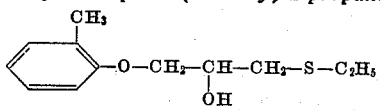

A mixture of 33.0 g. (0.53 mole) of ethyl mercaptan and 14 g. (0.35 mole) of flake sodium hydroxide in 75 ml. of dioxane is stirred and heated at 50° C. for 50 minutes. 64.5 g. (0.32 mole) of 1-chloro-3-(o-toloxy)-2-propanol (prepared by the method of Boyd and Marle, J. C. S. 97, 1788) is added during 15 minutes at room temperature and the mixture is heated and stirred for six hours on the steam bath. It is poured into water, and the oily product is extracted into ether. The combined ethereal extracts are washed with 10% sodium hydroxide, water and saturated sodium chloride solution, and dried over anhydrous sodium sulfate and distilled. The product is obtained as a light yellow oil, B. P. 141.5° C./less than 1 mm. to 149° C./1.5 mm.

*Analysis.*—Calculated for $C_{12}H_{18}O_2S$:

|   | Calculated | Found |
|---|---|---|
| C | 63.6 | 64.6 |
| H | 8.00 | 7.86 |

EXAMPLE XII

*N,N-dimethyl-2-[(1,3-diphenoxy)-2-propoxy]-ethylamine*

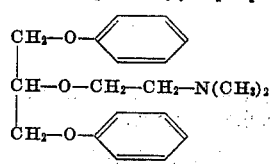

53.6 g. (0.22 mole) of 1,3-bis(phenoxy)-2-propanol (prepared by the method of Example I) is dissolved in 70 ml. of toluene, 4.6 g. (0.20 mole) of sodium is added piecewise and the mixture is refluxed for 15 hours under a nitrogen atmosphere. To the resulting homogeneous brown solution is added a dried solution of beta-dimethylaminoethyl chloride, prepared by neutralization of 34.6 g. (0.24 mole) of beta-dimethylaminoethyl chloride hydrochloride with 20.8 g. (0.26 mole) of 50% sodium hydroxide and extraction with 100 ml. of toluene in four portions. The reaction mixture is refluxed for 8 hours, cooled, and enough water is added to dissolve the precipitated sodium chloride. The toluene layer is separated, washed several times with water, and extracted with 3 M hydrochloric acid. The combined acid extracts are neutralized with 50% sodium hydroxide and extracted with ether. Drying of the combined ether extracts and distillation yields the product, B. P. 152–160° C./less than 1 mm. 30.2 g. of this oil is dissolved in anhydrous ether and the hydrochloride is prepared by saturation of the solution with dry hydrogen chloride. One recrystallization from methyl iso-butyl ketone gives a white product, M. P. 131–132° C.

*Analysis*: For $C_{19}H_{26}ClNO_3$:

|   | Calculated | Found |
|---|---|---|
| C | 64.8 | 64.7 |
| H | 7.46 | 7.91 |

A solution of 7.0 g. (0.022 mole) of N,N-dimethyl[(1,3-diphenoxy)-2-propoxy]ethylamine and 4 ml. (7.8 g.) (0.05 mole) of ethyl iodide in 40 ml. of isopropyl alcohol is allowed to stand at room temperature for one day. The solvent and excess ethyl iodide are removed by distillation, and crystallization of the residual oil is induced by addition of anhydrous ether and scratching. Crystallization from absolute ethyl alcohol-ethyl acetate gives white needles; M. P. 75–76.5° C.

*Analysis.*—Calculated for $C_{21}H_{30}INO_3$:

|   | Calculated | Found |
|---|---|---|
| C | 53.5 | 53.6 |
| H | 6.41 | 6.34 |

EXAMPLE XIII

*N,N-diethyl-2-[(1,3-diphenoxy)-2-propoxy]ethylamine*

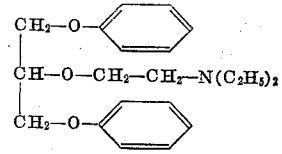

A. By employing the procedure of Example XII, substituting 208.5 g. (1.27 moles) of beta-diethylaminoethyl chloride hydrochloride, 285.4 g. (1.28 moles) of 1,3-bis(phenoxy)-2-propanol, 26.4 g. (1.15 moles) of sodium, and 1500 ml. of toluene, this compound is isolated as a heavy, yellow oil, B. P. 197° C./less than 1 mm. to 225° C. at 1 mm.

The hydrochloride is prepared in ether and recrystallized twice from ethyl acetate. M. P. 109–110° C.

*Analysis.*—Calculated for $C_{21}H_{30}ClNO_3$:

|   | Calculated | Found |
|---|---|---|
| C | 66.4 | 66.7 |
| H | 7.97 | 8.12 |

The dihydrogen citrate is prepared by addition of a saturated aqueous solution of citric acid to a toluene solution of the base. After successive recrystallizations from water and isopropyl alcohol, it melts at 113–114.5° C.

*Analysis.*—Calculated for $C_{27}H_{37}NO_{10}$:

|   | Calculated | Found |
|---|---|---|
| C | 60.5 | 60.8 |
| H | 6.96 | 7.22 |

B. An alternative procedure for the preparation of N,N-diethyl-2-[(1,3-diphenoxy)-2-propoxy]ethylamine is as follows:

A mixture of 24.4 g. (0.10 mole) of 1,3-bis(phenoxy)-2-propanol, 2.6 g. (0.11 mole) of lithium amide and 75 ml. of toluene is slowly raised to reflux and refluxed for four hours. A toluene solution of beta-diethylaminoethyl chloride, prepared from 19.0 g. (0.11 mole) of the corresponding hydrochloride as outlined in Example XII, is added over a 30-minute period and the mixture is refluxed for 17 hours. Enough water is added to destroy excess lithium amide and dissolve all inorganic material and the toluene layer is washed several times with water. Extraction of the toluene with dilute hydrochloric acid and neutralization of the extracts with 50% sodium hydroxide yields the crude basic ether. This is converted to the dihydrogen citrate by adding it to a saturated acetone solution of the citric acid. Subsequent recrystallizations from water and isopropyl alcohol give a white product.

Treatment of the free base with n-propyl iodide according to the method of Example XII, produces the quaternary n-propiodide.

EXAMPLE XIV

N-2-[(1,3-diphenoxy)-2-propoxy]ethylpiperidine

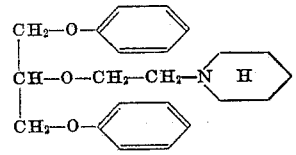

Utilizing the method of Example XII, but substituting 20.2 g. (0.11 mole) of 1-beta-piperidylethyl chloride hydrochloride, 27.8 g. (0.11 mole) of 1,3-bis(phenoxy)-2-propanol, 2.3 g. (0.10 mole) of sodium and 210 ml. of toluene, the above compound is obtained; B. P. 180–185° C. at less than 1 mm. 21.3 g. of the product is converted to the hydrochloride by the action of dry hydrogen chloride in anhydrous ether, yielding a product of M. P. 94–96° C. after recrystallization from ethyl acetate and ethyl acetate-ether.

*Analysis.*—Calculated for $C_{22}H_{30}ClNO_3$:

| | Calculated | Found |
|---|---|---|
| C | 67.5 | 67.9 |
| H | 7.73 | 7.69 |

A solution of 5.8 g. (0.016 mole) of 2-[(1,3-diphenoxy)-2-propoxy] ethylpiperidine and 5.7 g. (0.040 mole) of methyl iodide in 50 ml. of isopropyl alcohol is allowed to stand two days. After removal of the solvent and excess methyl iodide by distillation, crystallization of the residual oil is induced by addition of anhydrous ether and scratching. Two recrystallizations from absolute alcohol-ether yield the product; M. P. 78–80° C.

*Analysis.*—Calculated for $C_{23}H_{32}INO_3$:

| | Calculated | Found |
|---|---|---|
| C | 55.5 | 55.6 |
| H | 6.49 | 6.59 |

EXAMPLE XV

N,N-diethyl-2-[(1,3-di-p-chlorophenoxy)-2-propoxy] ethylamine

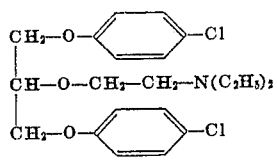

This compound is prepared by the method of Example XIII–B, using 62.6 g. (0.20 mole) of 1,3-bis(p-chlorophenoxy)-2-propanol, 5.5 g. (0.23 mole) of lithium amide, 41.3 g. (0.24 mole) of beta-diethylaminoethyl chloride hydrochloride, 350 ml. of toluene and 42.3 g. (0.22 mole) of citric acid. However, the method of isolation differs as follows: After a final reflux of 19 hours, the reaction mixture is cooled and an aqueous solution of 42.3 g. (0.22 mole) of citric acid is added. The mixture is heated to reflux for a few minutes and the two lower layers are separated. Crystallization of the middle layer is induced by cooling and scratching, and the product is collected by filtration. Subsequent recrystallizations from water, acetone, and ethyl alcohol give a white product; M. P. 122–123° C.

*Analysis.*—Calculated for $C_{27}H_{35}Cl_2NO_{10}$:

| | Calculated | Found |
|---|---|---|
| C | 53.6 | 53.7 |
| H | 5.84 | 5.65 |

Treatment of the free base with methyl sulfate produces the quaternary methosulfate salt.

EXAMPLE XVI

N,N-diethyl-2-[(1,3-diphenylmercapto)-2-propoxy] ethylamine

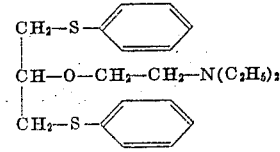

A solution of 39.5 g. (0.143 mole) of 1,3-bis(phenylmercapto)-2-propanol in 75 ml. of toluene is added during 45 minutes to a stirred suspension of 2.8 g. (0.122 mole) of molten sodium in 100 ml. of toluene. After two hours of reflux under nitrogen, a solution of beta-diethylaminoethyl chloride in 100 ml. of toluene prepared from 25 g. (0.145 mole) of the hydrochloride by the method of Example XII is added over a ten-minute period and the reaction mixture is refluxed for 20 hours. The mixture is cooled, enough water is added to dissolve all inorganic products, the toluene layer is washed twice with water and extracted three times with 25-ml. portions of 6 N hydrochloric acid. The combined acid extracts are neutralized with 50% sodium hydroxide, extracted with ether and the combined ether extracts are dried over anhydrous potassium carbonate and stripped, yielding a reddish oil. 38.6 grams of this crude product is dissolved in 75 ml. of acetone and treated with a solution of 20.6 g. (0.11 mole) of anhydrous citric acid in 75 ml. of acetone. The crude dihydrogen citrate is recrystallized once each from ethyl alcohol and acetone to yield a white product of M. P. 91°–92.5° C.

*Analaysis.*—Calculated for $C_{27}H_{37}NO_8S_2 \cdot \frac{1}{2}H_2O$:

| | Calculated | Found |
|---|---|---|
| C | 56.2 | 56.1 and 56.3. |
| H | 6.64 | 6.68 and 6.38. |

Treatment of the free base with methyl p-toluenesulfonate produces the quaternary metho-p-toluenesulfonate.

EXAMPLE XVII

N,N-dimethyl-2-[(1-phenylmercapto-3-o-toloxy)-2-propoxy] ethylamine

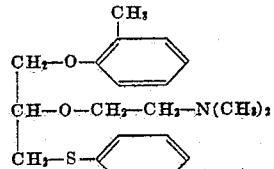

Following the method of Example XVI, substituting 46.8 g. (0.17 mole) of 1-phenylmercapto-3-(o-tolyloxy)-2-propanol, 3.5 g. (0.15 mole) of sodium and 28.8 g. (0.20 mole) of beta-dimethylaminoethyl chloride hydrochloride, this product was isolated as a crude. Distillation yielded a heavy, yellow oil, boiling at 208° C./1 mm. to 217° C./1.5 mm.

*Analysis.*—Calculated for $C_{20}H_{27}NO_2S$:

|   | Calculated | Found |
|---|---|---|
| C | 69.5 | 69.6 |
| H | 7.87 | 7.96 |

Treatment of the free base with sulfuric acid and with n-butylbromide produces the sulfate and the n-butobromide respectively.

EXAMPLE XVIII

N, N-diethyl-2-((1,3-di-p-nitrophenoxy)-2-propoxy)-ethylamine

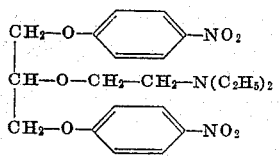

By employing the procedure of Example XIII-B, using 6.7 g. (0.02 mole) of 1,3-bis(p-nitrophenoxy)-2-propanol, 0.9 g. (0.04 mole) of lithium amide, and 4.3 g. (0.025 mole) of beta-diethylaminoethyl chloride hydrochloride, this compound is isolated, without distillation, in a crude yield as a yellow, crystalline solid. Two recrystallizations from ethyl alcohol and one from ethyl acetate give a product of M. P.—98°–100° C.

*Analysis.*—Calculation for: $C_{21}H_{27}N_3O_7$:

|   | Calculated | Found |
|---|---|---|
| C | 58.1 | 58.5 |
| H | 6.29 | 6.35 |

The tartrate and the benzobromide are prepared by treating the free base with tartaric acid and n-benzylbromide respectively.

EXAMPLE XIX

N,N-diethyl-2-((1-butoxy-3-phenoxy)-2-propoxy)-ethylamine

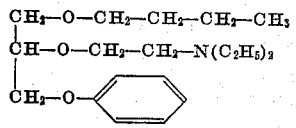

Using the method of Example XVI, but substituting 40.6 g. (0.20 mole) of 1-butoxy-3-phenoxy-2-propanol [Hine et al., J. Pharmacol. and Exptl. Therapeutics, 97, Pt. I, 414–19 (1949)], 3.7 g. (0.16 mole) of sodium and 34.4 g. (0.20 mole) of beta-diethylaminoethyl chloride hydrochloride, the above product is prepared as a crude. Distillation gives a colorless oil; B. P.—152° C./<1 mm. to 162° C./1 mm.

*Analysis.*—Calculated for $C_{19}H_{33}NO_3$:

|   | Calculated | Found |
|---|---|---|
| C | 70.5 | 70.2 |
| H | 10.03 | 10.32 |

Treatment of the free base with hydrobromic acid and with n-hexyl iodide produces the hydrobromide and the n-hexiodide respectively.

EXAMPLE XX

N,N-diethyl-2-[(1 - o-methylphenylmercapto-3-phenoxy)-2-propoxy]ethylamine

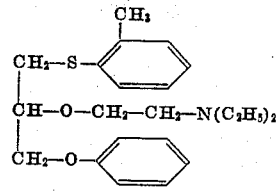

By employing the method of Example XVI, substituting 20.2 g. (0.073 mole) of 1-(o-methylphenylmercapto)-3-phenoxy-2-propanol in 75 ml. of toluene, 1.6 g. (0.070 mole) of sodium in 50 ml. of toluene and 14.6 g. (0.085 mole) of beta-diethylaminoethyl chloride hydrochloride, the above product is prepared and has B. P.—186°–89°/<1 mm.

*Analysis.*—Calculated for $C_{22}H_{31}NO_2S$:

|   | Calculated | Found |
|---|---|---|
| C | 70.8 | 70.9 |
| H | 8.38 | 8.43 |

The dihydrogen citrate is prepared in acetone, one recrystallization from isopropyl alcohol yielding a white product; M. P.—112–113.5° C.

*Analysis.*—Calculated for $C_{28}H_{39}NO_9S$:

|   | Calculated | Found |
|---|---|---|
| C | 59.5 | 59.5 |
| H | 6.95 | 6.85 |

Treatment of the free base with ethyl sulfate produces the ethosulfate.

EXAMPLE XXI

N,N-dimethyl-2-[(1,3-di-o-methylphenylmercapto)-2-propoxy]ethylamine

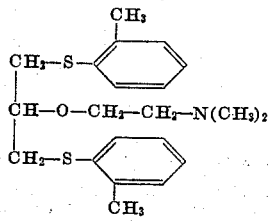

Following the procedure of Example XVI, using 35.6 g. (0.116 mole) of 1,3 - bis(o - methylphenylmercapto)-2-propanol in 75 ml. of toluene, 2.3 g. (0.100 mole) of sodium in 100 ml. of toluene and 17.3 g. (0.120 mole) of beta-dimethylaminoethyl chloride hydrochloride, this compound is obtained as a viscous yellow oil; B. P.—193°–199° C./<1 mm.

*Analysis.*—Calculated for $C_{21}H_{29}NOS_2$:

|   | Calculated | Found |
|---|---|---|
| C | 67.1 | 66.6 and 66.4 |
| H | 7.80 | 7.72 and 7.56 |

The hydrochloride is prepared in ether and recrystalized twice from ethyl acetate; M. P.—103°–105° C.

*Analysis.*—Calculated for $C_{21}H_{30}ClNOS_2$:

|   | Calculated | Found |
|---|---|---|
| C | 61.2 | 60.9 |
| H | 7.34 | 7.36 |

The n-hexochloride is prepared by reacting the free base with n-hexyl chloride under elevated conditions of temperature and pressure.

EXAMPLE XXII

N,N-diethyl-2-[(1-ethylmercapto-3-o-toloxy)-2-propoxy]ethylamine

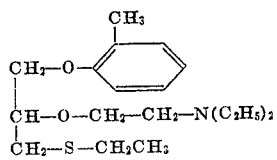

Utilizing the procedure of Example XVI, substituting 61.1 g. (0.278 mole) of 1-(o-toloxy)-3-ethylmercapto-2-propanol in 70 ml. of toluene, 4.6 g. (0.20 mole) of sodium in 150 ml. of toluene and 39.6 g. (0.23 mole) of beta-diethylaminoethyl chloride hydrochloride, the above compound is prepared as a light yellow oil; B. P.—146°–153° C./1 mm.

Analysis.—Calculated for $C_{18}H_{31}NO_2S$:

| | Calculated | Found |
|---|---|---|
| C | 66.4 | 66.4 |
| H | 9.60 | 9.61 |

The dihydrogen citrate is prepared in acetone and recrystallized from methyl iso-butyl ketone; M. P.—89°–90° C.

Analysis.—Calculated for $C_{24}H_{39}NO_9S$:

| | Calculated | Found |
|---|---|---|
| C | 55.7 | 55.7 |
| H | 7.59 | 7.76 |

The methobromide is prepared by reacting the free base with methyl bromide.

EXAMPLE XXIII

Ethyl((1,3-diphenoxy)-2-propoxy)acetate

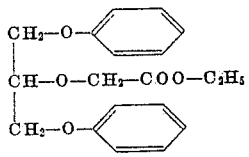

This compound is prepared by the method of Example XII, utilizing 101.0 g. (0.41 mole) of 1,3-bis(phenoxy)-2-propanol, 7.8 g. (0.34 mole) of sodium, 550 ml. of toluene, and 45.3 g. (0.37 mole) of ethyl chloroacetate in 200 ml. of toluene. After a final reflux of 13½ hours, enough ethyl alcohol is added to destroy excess sodium and water is added to dissolve the inorganic materials. The toluene layer is separated, washed with water and saturated sodium chloride and dried over anhydrous sodium sulfate. Distillation yields a viscous oil boiling at 210°–214° C./1.5 mm.

Analysis.—Calculated for $C_{19}H_{22}O_5$:

| | Calculated | Found |
|---|---|---|
| C | 69.0 | 69.3 |
| H | 6.70 | 6.61 |

EXAMPLE XXIV 2-((1,3-diphenoxy)-2-propoxymethyl)imidazoline

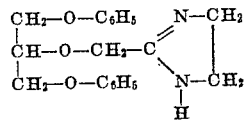

A mixture of 33.0 g. (0.1 mole) of ethyl((1,3-diphenoxy)-2-propoxy)acetate and 30.0 g. (0.5 mole) of anhydrous ethylenediamine is heated for 89 hours on the steam bath with protection from moisture. Water, alcohol, and excess ethylenediamine are removed by distillation, and the residual heavy oil is distilled in vacuo, yielding a red-brown oil of B. P. 238°–241° C./2 mm. The hydrochloride is prepared by saturation of an ether solution of the oil with dry hydrogen chloride. Two recrystallizations from isopropyl alcohol give a white product; M. P.—168°–168.5° C.

Analysis.—Calculation for $C_{19}H_{23}ClN_2O_3$:

| | Calculated | Found |
|---|---|---|
| C | 62.9 | 62.9 |
| H | 6.38 | 6.52 |

Additional examples within the scope of this invention which may be made by the methods disclosed above include the following:

1. N,N-di-n-butyl-2-((1-phenoxy-3-para-chlorophenoxy)-2-propoxy)isopropylamine
2. N,N - di - isopropyl - 2-((1-p-tolyloxy-3-ortho-chlorophenoxy)-2-propoxy)-2-methyl-isopropylamine
3. N,N - di - isohexyl - 4((1 - methoxy-3-para-methoxyphenoxy)-2-propoxy)-n-butylamine
4. N,N - di - n - amyl-3((1-benzyloxy-3-cyclohexyloxy)-2-propoxy)-n-propylamine
5. N - 2((1 - cyclopentyloxy - 3 - n-propoxy)-2-propoxy) methyl-piperidine
6. N - 3((1 - n - butylmercapto - 3 - methylmercapto) - 2-propoxy)-n-propylpyrrolidine
7. N' - methyl - N - 4-((1-n-amylmercapto-3-n-propoxy)-2-propylmercapto)-n-butylpiperazine
8. N - 2-((1,3-di-ethylmercapto)-2-propylmercapto)ethyl-γ-pipecoline
9. 2 - methyl - N - 2((1 - isobutylmercapto - 3-ethoxy)-2-propyl-mercapto)-ethyl-pyrrolidine
10. N - 2 - ((1-benzyloxy-3-cyclohexyloxy)-2-propoxy)-isopropyl-α-pipecoline
11. N - 3 - ((1 - orthomethoxyphenoxy-3-m-tolyloxy)-2-propoxy)-n-propylmorpholine
12. N' - ethyl - N - 6((1 - cycloheptyloxy - 3 - ortho-nitrophenoxy)-2-propylmercapto)-n-hexylpiperazine
13. Phenyl 3 - phenoxy - 2 - diethylaminoethoxy-n-propyl sulfone
14. n-Butyl 3-phenylmercapto-2-dimethylaminoethoxy-n-propyl sulfone
15. o-Tolyl 3 - para - chlorophenoxy-2-(di-n-propylaminoethylmercapto)-n-propyl sulfone
16. Dimethylaminoethyl 1,3-diphenoxy-2-propyl sulfone The invention also contemplates the non-toxic organic and inorganic acid addition salts of the compounds having the general formula above such as will be readily formed with, for example, organic and inorganic acids such as hydrochloric, sulfuric, sulfamic, tartaric, hydrobromic, hydriodic, glycolic, citric, maleic, phosphate, succinic, acetic, benzoic, cinnamic, mandelic, malic, ascorbic, and the like. The method of preparation of these salts is made apparent in the examples above.

This invention also contemplates the quaternary salts of the free bases of the general formula above, which may be prepared as made apparent in the examples above by treatment of the free bases with quaternary salt-forming substances. These quaternary salt-forming substances include methyl chloride, methyl bromide, methyl iodide, ethyl chloride, ethyl bromide, ethyl iodide, n-propyl chloride, n-propyl bromide, n-propyl iodide, isopropyl bromide, n-butyl chloride, n-butyl bromide, isobutyl bromide, sec.-butyl bromide, n-amyl bromide, n-hexyl chloride, benzylchloride, benzyl bromide, methyl sulfate, ethyl sulfate, methyl benzenesulfonate, methyl p-toluenesulfonate, etc. which will react directly with any free base of the general formula above to give respectively the methochloride, methobromide, methiodide, ethochloride, ethobromide, ethiodide, n-propochloride, n-propobromide, n-propiodide, isopropobromide, n-butochloride, n-butobromide, isobutobromide, sec.-butobromide, n-amobromide, n-hexochloride, benzochloride, benzobromide, methosulfate, ethosulfate, methobenzenesulfonate, metho-p-toluenesulfonate, etc.

In general, the salts are soluble in water and constitute a preferred form of the invention. The organic bases, on the other hand, are generally water-insoluble, but soluble in simple organic solvents such as alcohols, ethers, hydrocarbons, and lower ketones.

We claim:

1. A compound selected from the group consisting of a free base having the structure

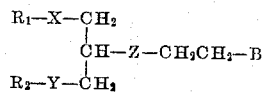

wherein $R_1$ represents a member selected from the group consisting of (lower)alkyl, phenyl, chlorophenyl, tolyl, and nitrophenyl and $R_2$ represents a member selected from the group consisting of phenyl, chlorophenyl, tolyl and nitrophenyl; X, Y and Z represent members selected from the group consisting of oxygen and sulfur, at least one being oxygen; B represents a member selected from the group consisting of di(lower)alkylamino, piperidino, morpholino, pyrrolidino, (lower)alkylpyrrolidino, N'-alkylpiperazino and pipecolino; and the non-toxic acid addition salts and the non-toxic quaternary salts of said free base.

2. A compound selected from the group consisting of the free base, the non-toxic acid addition salts and the non-toxic quaternary salts of N,N-dimethyl-2-((1,3-diphenoxy)-2-propoxy)ethylamine.

3. A compound selected from the group consisting of the free base, the non-toxic acid addition salts and the non-toxic quaternary salts of N,N-diethyl-2-((1,3-diphenoxy)-2-propoxy)ethylamine.

4. A compound selected from the group consisting of the free base, the non-toxic acid addition salts and the non-toxic quaternary salts of N-2-((-1,3-diphenoxy)-2-propoxy)ethylpiperidine.

5. A compound selected from the group consisting of the free base, the non-toxic acid addition salts and the non-toxic quaternary salts of N,N-diethyl-2-((1,3-diphenylmercapto)-2-propoxy)ethylamine.

6. A compound selected from the group consisting of the free base, the non-toxic acid addition salts and the non-toxic quaternary salts of N,N-di-isopropyl-2-((1,3-diphenoxy)-2-propoxy)ethylamine.

References Cited in the file of this patent

UNITED STATES PATENTS 2,445,356     Kharasch et al. _____ July 20, 1948

FOREIGN PATENTS 560,568       Great Britain _____ Apr. 11, 1948